US008321466B2

(12) United States Patent
Black et al.

(10) Patent No.: US 8,321,466 B2
(45) Date of Patent: Nov. 27, 2012

(54) SYSTEM AND METHOD FOR CREATING AND UTILIZING METADATA REGARDING THE STRUCTURE OF PROGRAM CONTENT STORED ON A DVR

(75) Inventors: Jeremy Black, Santa Ana, CA (US); Patrick H. Hayes, Mission Viejo, CA (US)

(73) Assignee: Universal Electronics Inc., Santa Ana, CA (US)

( * ) Notice: Subject to any disclaimer, the term of this patent is extended or adjusted under 35 U.S.C. 154(b) by 1549 days.

(21) Appl. No.: 11/315,075

(22) Filed: Dec. 22, 2005

(65) Prior Publication Data

US 2007/0156739 A1    Jul. 5, 2007

(51) Int. Cl.
*G06F 7/00* (2006.01)

(52) U.S. Cl. .......... 707/802; 707/805; 707/825; 725/38; 725/131; 348/563; 348/734; 386/201; 386/234; 386/248

(58) Field of Classification Search .............. 707/999.1, 707/999.102, 802, 805, 825; 725/38, 131; 348/563, 734; 386/201, 234, 248
See application file for complete search history.

(56) References Cited

U.S. PATENT DOCUMENTS

| | | | |
|---|---|---|---|
| 5,692,093 A | 11/1997 | Iggulden et al. | |
| 5,696,866 A | 12/1997 | Iggulden et al. | |
| 5,701,383 A | 12/1997 | Russo et al. | |
| 5,953,487 A | 9/1999 | Engle et al. | |
| 5,987,210 A | 11/1999 | Iggulden et al. | |
| 6,233,389 B1 | 5/2001 | Barton et al. | |
| 6,285,818 B1 | 9/2001 | Suito et al. | |
| 6,360,053 B1 | 3/2002 | Wood et al. | |
| 6,459,735 B1 | 10/2002 | Suito et al. | |
| 6,642,939 B1 | 11/2003 | Vallone et al. | |
| 6,757,906 B1 | 6/2004 | Look et al. | |
| 6,781,638 B1 | 8/2004 | Hayes | |
| 6,850,691 B1 | 2/2005 | Stam et al. | |
| 6,937,658 B1 | 8/2005 | Suito et al. | |
| 2003/0093790 A1* | 5/2003 | Logan et al. ................ 725/38 |
| 2003/0122966 A1* | 7/2003 | Markman et al. ........... 348/563 |
| 2003/0140083 A1 | 7/2003 | Watkins | |
| 2003/0202773 A1 | 10/2003 | Dow et al. | |
| 2004/0190853 A1 | 9/2004 | Dow et al. | |
| 2004/0220926 A1* | 11/2004 | Lamkin et al. ................ 707/3 |
| 2004/0221311 A1 | 11/2004 | Dow et al. | |
| 2004/0230994 A1 | 11/2004 | Urdang et al. | |
| 2004/0250291 A1* | 12/2004 | Rao et al. .................. 725/131 |
| 2005/0108769 A1 | 5/2005 | Arnold et al. | |
| 2005/0210524 A1 | 9/2005 | Dolph | |
| 2005/0262539 A1 | 11/2005 | Barton et al. | |

* cited by examiner

*Primary Examiner* — Hosain Alam
*Assistant Examiner* — Jieying Tang
(74) *Attorney, Agent, or Firm* — Greenberg Traurig, LLP

(57) ABSTRACT

Metadata regarding program content is created by monitoring a manner in which a first rendering of the program content is affected by a user whereupon the metadata will include data which defines one or more segments within the program content. The data within the metadata is then usable during a second rendering of the program content to inhibit, e.g., advance over during playing or omit during copying, the rendering of the one or more segments within the program content defined by the data within the metadata.

17 Claims, 7 Drawing Sheets

```
<TV program>
    <program header>
        <title> amazing race </title>
        <network> cbs </network>
        <air date>
            <time zone> pst </time zone>
            <time> 20:00:00 </time>
            <day> 22 </day>
            <month> 11 </month>
            <year> 2005 </year>
        </air date>
        <duration> 60:00 </duration>
        <service>
            <zip> 92691 </zip>
            <provider> cox </provider>
            <channel> 702 </channel>
        </service>
    </program header>
    <skip data>
        <offset> 00:02:15 </offset> <length> 00:03:00 </length>
        <offset> 00:15:32 </offset> <length> 00:04:03 </length>
        <offset>....</length>
            ..etc..
            ..etc..
            ..etc..
    </skip data>
</TV program>
```

502 — program header section
504 — skip data section

FIGURE 5

SYSTEM AND METHOD FOR CREATING AND UTILIZING METADATA REGARDING THE STRUCTURE OF PROGRAM CONTENT STORED ON A DVR

BACKGROUND

Digital video recorders, sometimes referred to as personal video recorders, and the features and functions provided by them are well known in the art. Exemplary digital video recorders include standalone devices, such as the TiVO or Replay TV brand products, digital video recorders which are physically integrated into television sets, cable or satellite set top boxes, personal computers or media center servers having digital video recorder functionality implemented via a software application, etc. which are collectively referred to hereinafter as digital video recorders or DVRs. The existing state of DVR technology may be found in, for example, U.S. Pat. Nos. 5,701,383, 6,233,389, 6,360,053, 6,642,939, 6,757,906, 6,850,691 or U.S published Patent Applications 2005/0262539A1, 2005/0108769A1 or 2005/0210524A1 each of which is incorporated herein by reference in its entirety. This existing DVR technology has gained wide acceptance by consumers and, amongst other purposes, is frequently utilized for "time shifting," that is recording broadcast program content for later viewing at a more convenient time. One of the benefits of time shifting is that during subsequent playback, the user has the ability to skip through commercial advertising segments, typically by using a "fast forward" or "quick skip" key on the remote control provided with the DVR. However, though popular with owners of DVRs, exercise of this capability still requires the attention and active involvement of a user each and every time an item of recorded program content is viewed. Accordingly, a need exists for a system and method to monitor and store the results of these user actions in order that they may be used to facilitate future re-viewing of the same content and/or shared with other users of similar systems.

SUMMARY OF THE INVENTION

This invention relates generally to digital video recording and systems and methods for gathering, storing, and disseminating metadata regarding the structure of program content recorded (or to be recorded) via digital video recording for the purposes of enhancing a user's playback experience. In accordance with the description that follows, a system and method is provided for monitoring a user's interactions with a wireless remote control device as the user skips through program content during playback of a program content previously recorded using a DVR. The information gathered by this monitoring activity may be used create the metadata which, for example, identifies the location and duration of segments of advertising material within the recorded content, timeouts in sporting events, etc. This metadata may then be stored locally for subsequent use while re-viewing or transferring the recorded content, may be uploaded to a central site for sharing with other users, or both. In this manner, the metadata is useful, for example, to allow for the viewing and/or storage of the content without the need to view and/or store the commercial advertising, sporting event timeouts, or other program content that has been generally skipped during previous viewing(s) of the content.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which:

FIG. 5 illustrates an exemplary mark-up language which may be used for the expression and storage of the metadata;

DETAILED DESCRIPTION

Figure 1:
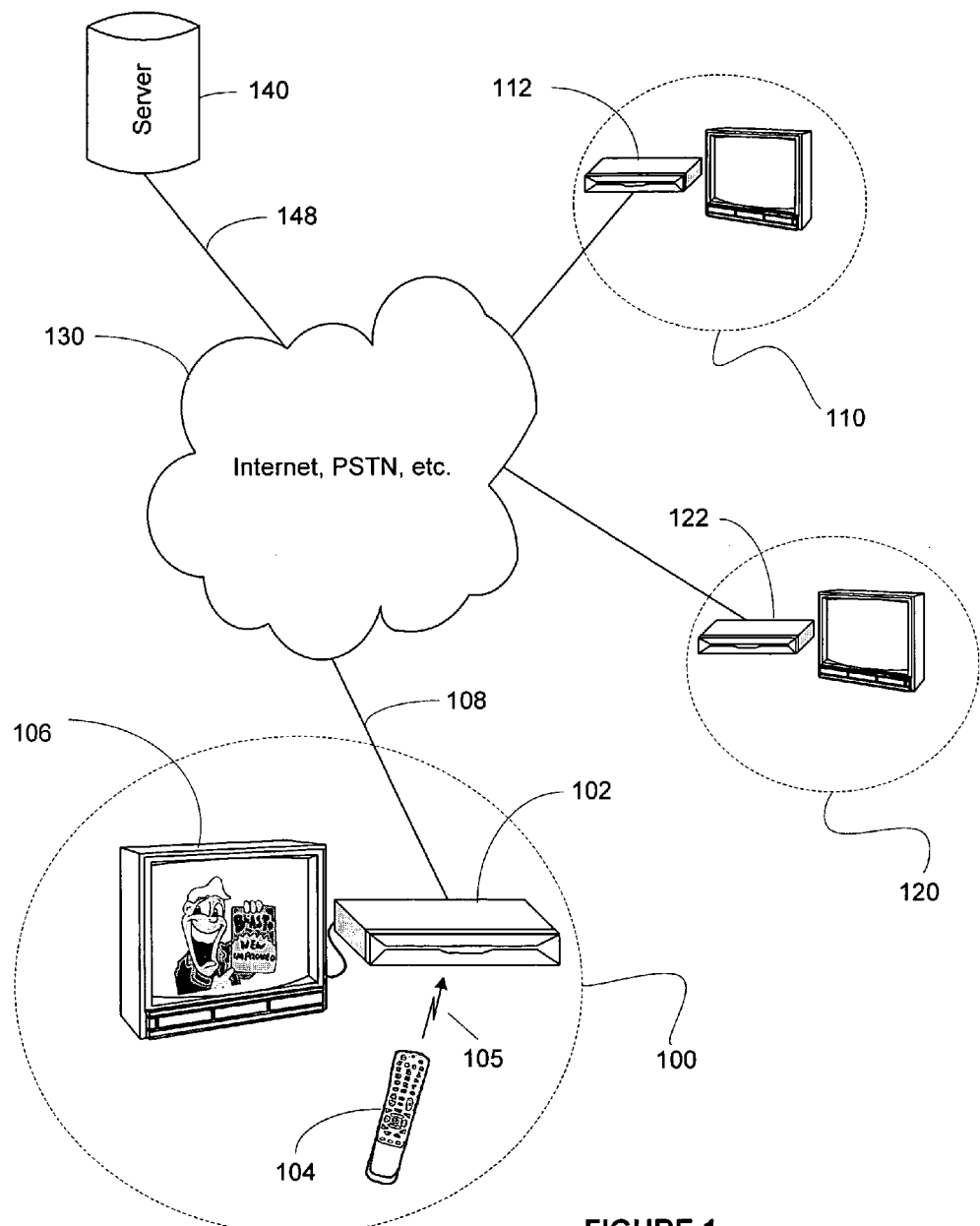
FIG. 1 illustrates an exemplary system and network in which the gathering and utilization of metadata regarding the structure of program content may be implemented.

FIG. 1 illustrates an exemplary embodiment in which a DVR 102 in location 100 is shown playing back a previously recorded program on TV 106, under the general control of the user of remote control 104. It will be appreciated that although an exemplary embodiment is presented hereinafter in the context of previously recorded TV programs on a DVR, the systems and methods described may be generally applied to any audiovisual media content, for example radio broadcasts, prerecorded CD or DVD based material, Internet webcasts, VCR or cassette tape based material, etc., without limitation. Commands 105 initiated by user interaction with remote control 104 are received and acted upon by DVR 102 as is well known in the art. In the illustrated embodiment, software algorithms within DVR 102 also monitor commands received from the remote control 104 for the purpose of generating metadata regarding the program content currently being viewed, as will be described in more detail hereafter. Once collected, this metadata may be stored locally within the DVR for future use. The metadata may also be communicated to a remotely located server 140 via an external network 108, 130, 148 such as, for example, the Internet, the public switched telephone network (PSTN), a cable television distribution system, etc. Once transferred to server 140, the metadata may be processed and merged with similarly received metadata created during viewing of the same content by other viewers, for example, a viewer accessing the content on DVR 112 at location 110. As will be further described herein, it is believed that processing and merging metadata from multiple viewers of the same content may help to improve the overall accuracy of the metadata. Metadata stored on the server 140 may then be made available to subscribing DVRs, for example DVR 122 at location 120, for use during playback of the content to which retrieved metadata applies which content has been locally recorded by the subscribing DVRs. It will be appreciated that transfer of metadata via an external network may be accomplished by any network capable DVR using well know wired and/or wireless networking technologies such as for example Ethernet, 802.11 wireless, Bluetooth, and the like and that there is provided a means to associate generated metadata with the program content to which the metadata applies.

Figure 2:
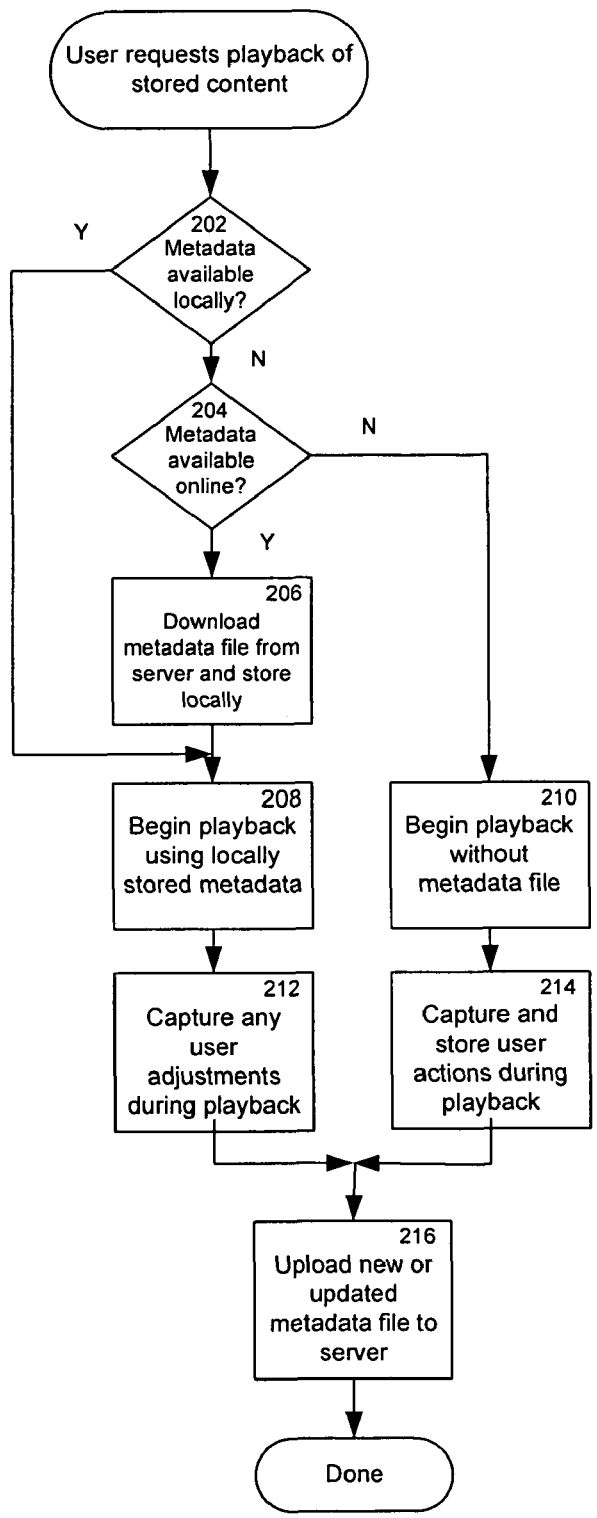
FIG. 2 illustrates an exemplary flow of operation of a DVR equipped to gather and utilize the metadata.

Turning now to FIG. 2, the general sequence of events that occur during playback of content on DVR 102 is shown. The sequence would generally commence with a user selecting an item of stored program content and issuing a playback command whereupon the internal logic of the DVR first checks 202 if metadata regarding this item is available locally. If the metadata regarding the content to be played is available locally, it loads this metadata and proceeds to playback 208. If the metadata regarding the content to be played is not locally available, the DVR logic may then check 204 whether appropriate metadata is available online, for example from a server 140. If the metadata regarding the content to be played is available on line, it may be downloaded 206 and stored locally for use during the playback of the content. If no metadata for the content to be played is available either locally or retrievable from a remote source, the DVR logic commences playback 210 without use of any existing metadata.

During metadata-enhanced playback 208, 212 the DVR logic utilizes the metadata values to skip, fast-forward, remove, or otherwise modify commercial or other predetermined segments within the recorded program content as indicated. If the user at any time finds it necessary to make manual adjustments due to imperfect metadata values—for example, incremental forward or reverse motion due to a metadata-provided segment duration being too short or too long—these activities may be captured 212 by the DVR logic for local storage during subsequent playback operations, or later upload to the server from which the original metadata was obtained, as desired for a particular application. Metadata-enhanced playback is described in greater detail hereafter in conjunction with FIG. 6.

Figure 3:
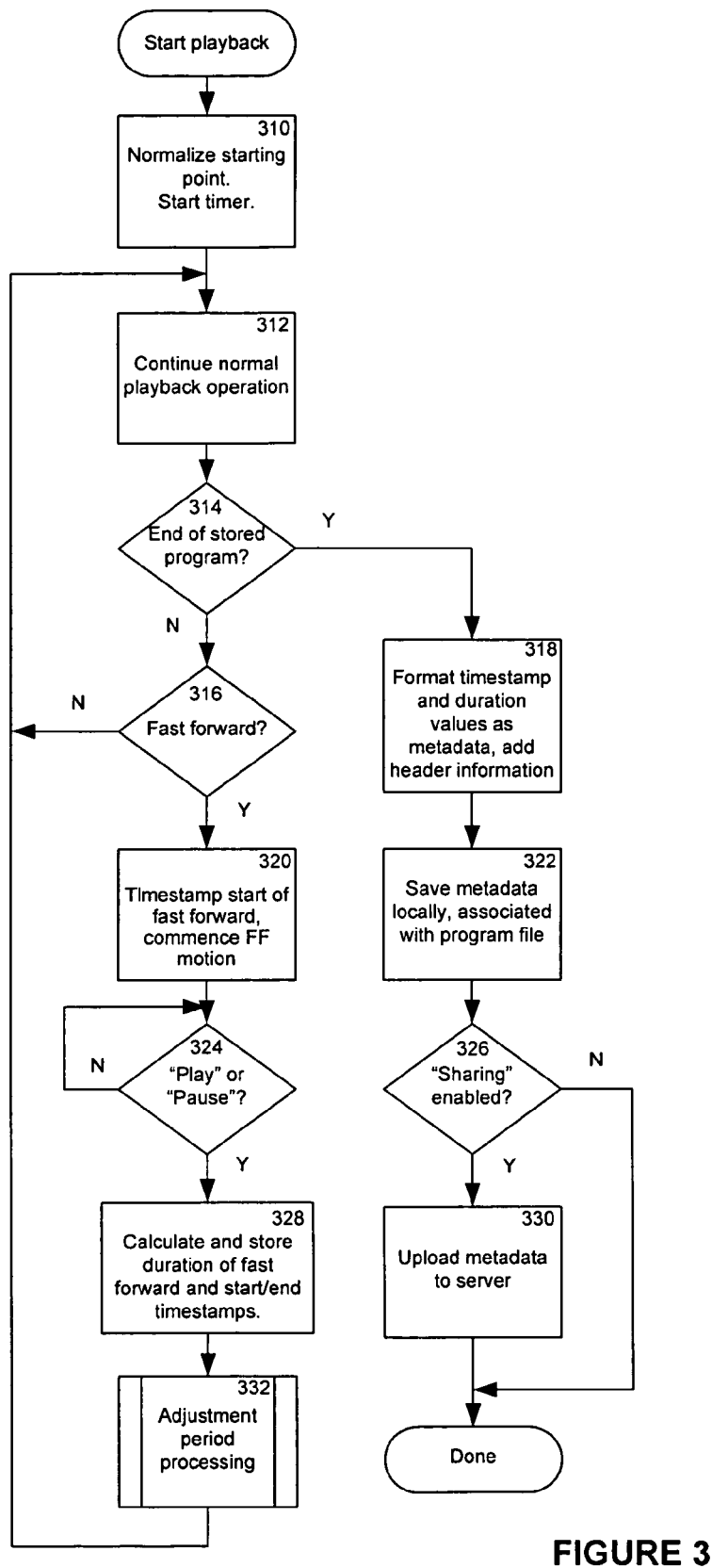
FIG. 3 illustrates in greater detail an exemplary method for monitoring user actions during playback to derive the metadata.

During non metadata-enhanced playback such as occurs at 210 when no metadata can be located for the currently selected content to be played, the DVR logic monitors user actions during playback 214 and uses this information to create a new set of metadata specific to the content being played back, as will be described in more detail hereafter in conjunction with FIG. 3.

On completion of playback, or at any time after capture as desired to accomplish a particular application, the newly created (from 214) or freshly updated (from 212) metadata values may be uploaded to the server 140 where this metadata may be used to initiate or further refine a metadata set for the associated program content for sharing with others. In this context, server 140 may make use of various algorithms and statistical methods as are well known in the art in order to continuously refine sharable metadata sets based upon new or updated values received from a multiplicity of subscribing playback systems 102, 112, 122, etc.

The monitoring of user actions and generation of metadata will now be described in greater detail in conjunction with FIG. 3. When playback commences, the DVR logic 310 first normalizes the starting point for the program content and starts a timer running at that point. By way of example, some DVRs, as a safety measure, may begin the recording process a short period of time prior to the actually scheduled start time of the broadcast—in some cases this may even be a user adjustable option. Since various DVR models may use different parameters for this aspect of their recording process, and the metadata to be gathered is intended to be generally applicable across multiple brands and models of DVRs, it is important that time values within the metadata are relative to the true start of the program content, or are otherwise synchronized such that a desired application (e.g., skipping of program content portions) works properly during playback. Accordingly, the DVR may start the elapsed time timer to be used for metadata capture a short time after actual playback has commenced. Alternatively, for even greater accuracy a user input (e.g., a button on the remote control) may be provided which can be activated to indicate the exact starting point of the program and/or the start of some universally recognized portion of program content, e.g., the first commercial break.

Once a reference time point for the content has been established and the timer started, normal playback operation 312 commences and continues until either the end of the stored program content is reached 314 or a user action occurs 316, in this example receipt of a "fast forward" command. Upon this action, the current elapsed time timer value is captured and saved as a beginning timestamp and the fast forward action is performed. Fast forwarding continues until receipt of a play or pause command 324. Upon cessation of the fast forward action, the elapsed time timer value is once again captured and the difference between this and the saved beginning timestamp value, together with the known speed of the fast forward function, is used to calculate the duration of the skipped over program segment in actual elapsed program time. This is then saved 328 together with the starting and ending timestamps for use in generating metadata. It should be noted that although not illustrated, many DVRs support multiple fast forward speeds—for example repeated "fast forward" commands may result in forward speeds of 4×, 16×, 32×, etc.—so in some embodiments the calculation of the duration of the skipped over period may be required to take into account that the monitored activity may comprise multiple steps at differing speeds, i.e. the general algorithm for calculation of skip duration may be of the form:

$$\text{Duration} = \sum_{i=1}^{n} (\text{time}(i) * \text{speed}(i))$$

It will be appreciated that in embodiments where a "skip forward" command is available (for example, as provided on certain Replay TV products in accordance with the teachings of the above referenced U.S. Pat. No. 6,360,053) and this is used in place of the "fast forward" command, the duration may be more simply calculated by multiplying the number of skip commands received by the predetermined skip time. It will be further appreciated that in the event a "Pause" command is received at 324 instead of a "play" command, the processing is essentially the same as described above except that the elapsed time timer is also halted until a subsequent "play" command is received. Likewise in embodiments where a "scrub" function is available (typically operated via a slider bar interface) in order to allow a user random access to any point in the program, the duration, or new playback location may be calculated either by reference to timecode values embedded in or associated with the program, or through reference to the proportional value of progress through the program (generally as indicated by the slider bar location during scrub operations) as compared to the total time length of the program and its associated metadata values.

Upon completion and recording of the initial forward skipping activity, the DVR logic may enter an adjustment period 332 during which user activity is monitored for corrections to any overshoot or undershoot that may have occurred in the primary skipping process (e.g., the logic may adjust the duration time value associated with operation being tracked taking into consideration the degree to which the viewing of the content is fine tuned forward or backward in time after the operation is initially requested rather than store the duration times associated with the fine tuning operations themselves, if any), after which the DVR logic returns to the normal playback mode 312, 314, 316.

On reaching the end 314 of the stored program content, the DVR logic post-processes the saved timestamp and duration values, formats them into metadata entries, and saves these together with header information regarding the content to which the metadata entries apply. An exemplary structure for such metadata is discussed hereafter in conjunction with FIG. 5. With respect to the above mentioned post-processing, to allow the metadata to be universally applicable the metadata time values are preferably absolute, i.e., the metadata values represent true elapsed time displacements measured from the reference time point, e.g., a start of the program, or other uniquely identifiable time such as the start of the first commercial break, as if all commercial content had been played back at regular speed. This thereby allows the metadata to be equally applicable to any DVR playback model regardless of that device's fast forward speeds (or predetermined "skip forward" times) as well as allowing the metadata to be used to manage content originating from different transmission systems (e.g., different cable systems, different time zones, different networks, etc. which may have different relative time starts for the content).

To achieve this goal, when timestamps captured during playback are real time values, all timestamps after the first time stamp would be adjusted to compensate for the amount of fast forwarding action that has occurred. For example, the captured timestamp for the beginning of a second commercial segment would be incremented in order to compensate for fast forwarding activity that occurred during the first commercial segment; the captured timestamp for the beginning of a third commercial segment would be incremented to compensate for fast forwarding that occurred during both the first and second commercial segments, and so on. The increments may be derived from the known fast forward speed values (or from known "skip forward" times). Thus, by way of still further example, if skipping through a commercial segment was monitored to take 15 seconds at an 8× forward rate, then the increment by which all subsequent metadata times should be adjusted is (8−1)*15 or 105 seconds, i.e., the commercial segment was actually 120 seconds in length. In the exemplary embodiment presented above, this increment value may be readily determined by subtracting the measured fast forwarding period (i.e., end timestamp minus start timestamp) from the previously calculated and stored skip duration. It will also be appreciated that in certain recording embodiments absolute time values may be embedded within the recorded data, and in these instances metadata time values may be more conveniently derived by reference to the recorded material itself.

Once the metadata has been created, the created metadata may be saved locally 322 for future use in automatic skipping of content segments when the same content is re-viewed or transferred to other media. Such local metadata may be stored separately from the associated recorded program material, or may be embedded or appended to the recorded material. If the DVR is configured to share metadata with the network, the newly-created metadata may also be uploaded 330 to a remote server for communal storage and ultimate sharing with other users.

Figure 4:
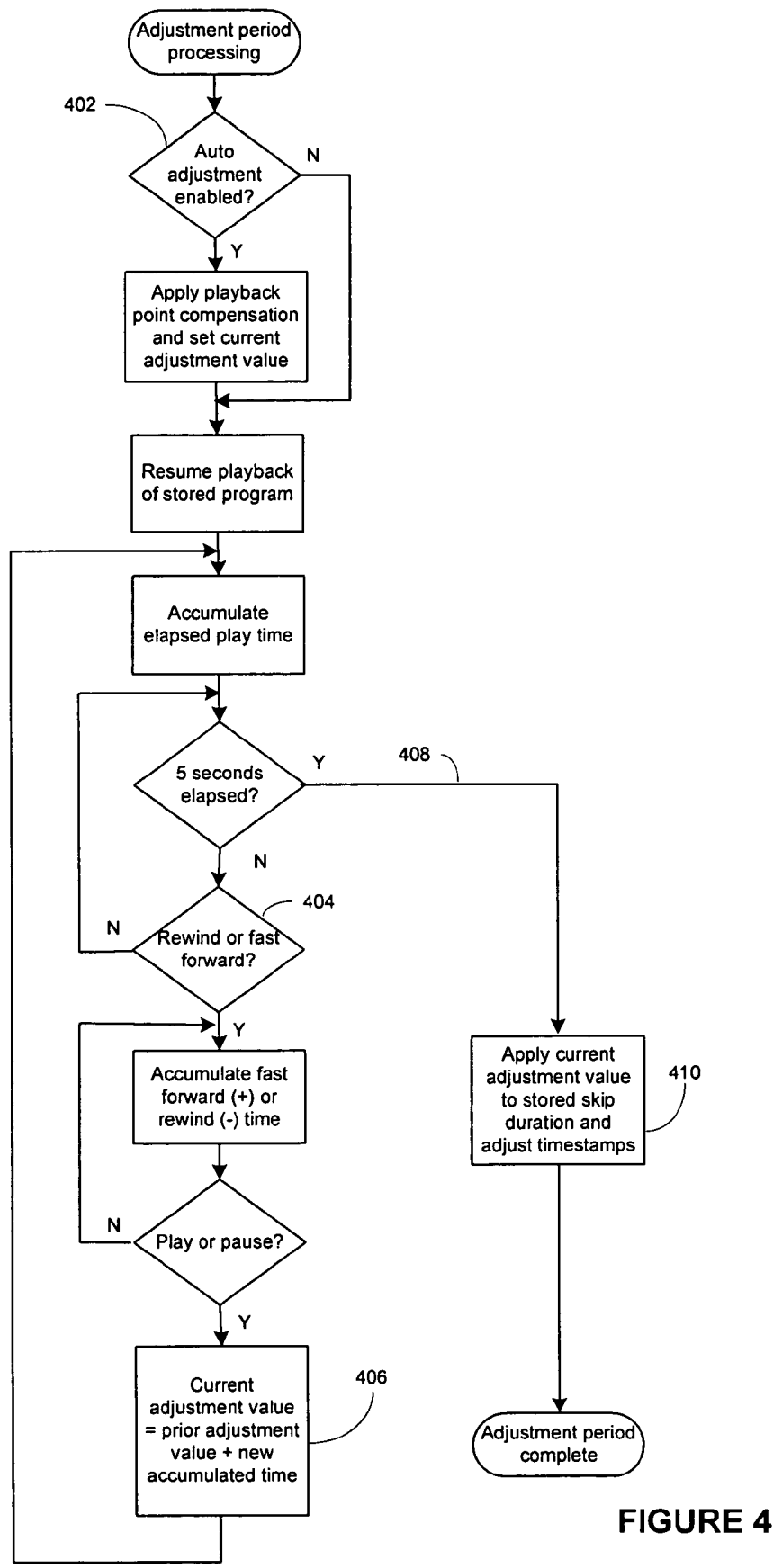
FIG. 4 illustrates an exemplary method of adjusting for overshoot or undershoot (resulting from, for example, user reaction time with a controlling device) during the monitoring process illustrated in FIG. 3.

Turning now to FIG. 4, an exemplary adjustment period processing 332 algorithm will be discussed in greater detail.

Typically, when a user is manipulating the fast forward and play keys on a remote control to skip through commercial advertising content, a certain amount of overshoot or undershoot is inherent due to factors such as inattentiveness, reaction time, premature resumption of play mode, etc. Certain prior art DVR devices, e.g., some TiVO brand DVRs, are equipped to automatically compensate for this (mostly with respect to reaction time) by backing up the playback point a small fixed or user adjustable amount whenever the unit transitions from fast forward to regular playback speed, as described for example in the previously referenced U.S. Pat. No. 6,850,691. While the above techniques are suitable for situations where a user is manually controlling playback, capture of metadata information for use in automatic skipping of commercial advertising segments may require a higher degree of accuracy. Accordingly in an exemplary embodiment, after completion of a commercial skip (either user-initiated or automatic based on previously acquired metadata) the DVR logic may first apply any automatic compensation 402 in a manner consistent with the prior art and, thereafter, the DVR logic may additionally treat any user-initiated fast forward or rewind activity 404 during the first five seconds of resumed playback as an adjustment to the recently completed skip, rather than the start of a new action. The arithmetic sum of all such incremental steps forward and backward may be accumulated 406 until such time as a five second playback period elapses without any further activity 408, at which point the adjustment period is deemed complete and the accumulated incremental value applied 410 to the previously calculated (or loaded) commercial duration contained in the metadata. Though not illustrated in detail, it will be appreciated that as further indicated at 410, upon completion of this adjustment period metadata absolute time values might also be adjusted as previously described to compensate for any additional fast forward or rewind activity that has occurred. If automatic adjustment is enabled, all or part of the accumulated incremental value may also be used to improve the accuracy of future automatic actions. It will also be appreciated that an elapsed time other than five seconds may be used to define the expiry of the adjustment period, as appropriate to various embodiments. It will be further understood and appreciated that the calculations and/or algorithms used in connection with the above described error correction and adjustment operations with respect to the user activity/command capture, or subsequent modified playback of a program using metadata, will be well within the ordinary abilities of those skilled in the art without undue experimentation.

Turning now to FIG. 5, an exemplary set of metadata for a specific item of program content may comprise a header section 502 which includes the information necessary to uniquely identify the content, followed by a body section 504 which consists of a tabulation of the start time and length of all commercial advertising segments in that program. Header 502 may contain, for example, the title of the program, the name of the broadcast network, the air date (including time zone, since different time zones may receive slightly different programming, especially as regards commercial breaks), the published duration of the program, and the service from which the content was recorded including the zip code in which the receiving DVR is located, the name of the service provider (or "air" if from over-the-air antenna) and the channel number. It will be appreciated that the same program may be broadcast simultaneously on multiple channels by the same service provider, e.g., regular definition and high definition versions, once again with a possibility of minor timing differences. Some of the data items contained in the header may be input by the user during initial set-up of the DVR (e.g., zip code, service provider) while others may be derived from the program guide database maintained within or accessible to the DVR at the time of original recording and stored together with or associated with the recorded content (e.g., program name, network, original airtime).

The main body of the exemplary metadata 504 comprises a series of individual entries, each containing the start time (expressed as an absolute time offset from the beginning of the normalized recorded content) duration of one commercial advertising segment.

Figure 6:
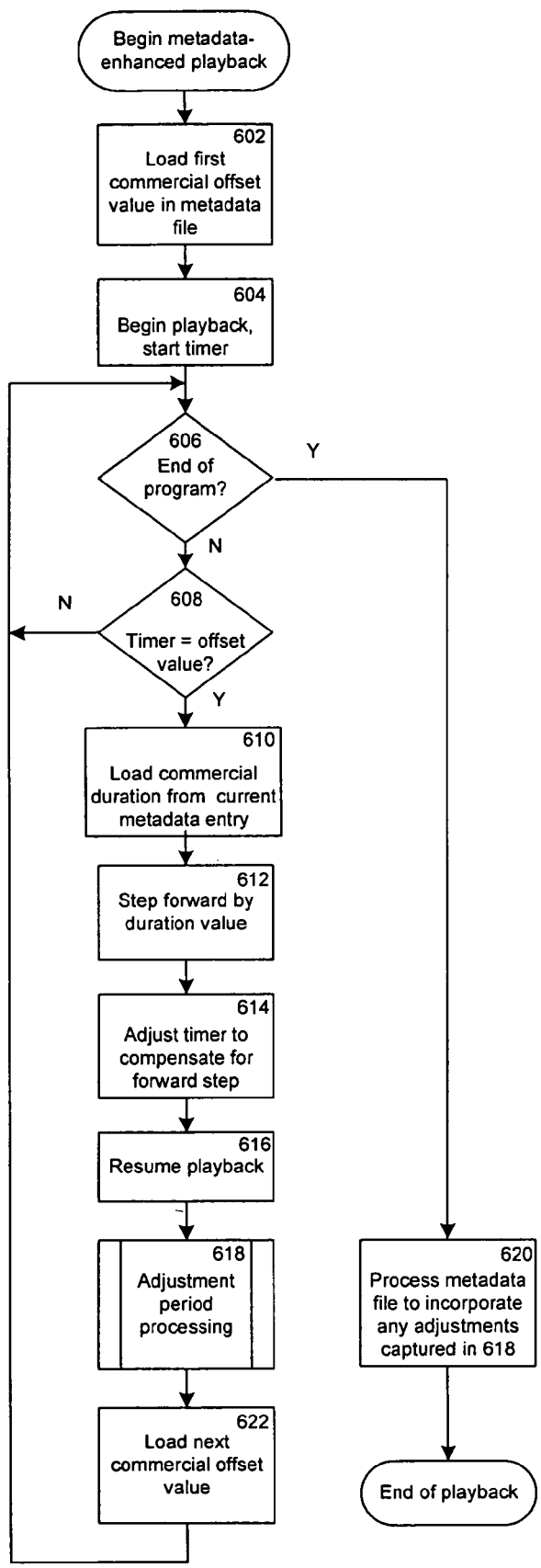
FIG. 6 illustrates an exemplary method for metadata-enhanced playback of program content.

Turning now to FIG. 6 an exemplary method for utilizing commercial metadata during program playback (corresponding to blocks 208 and 212 of FIG. 2) is illustrated. Upon receipt of a playback command, the DVR logic loads the offset value of the first commercial advertising segment 602 from the metadata file, starts a timer and begins playback of the program content 604. Playback continues until the timer value matches that of the currently loaded offset 608. The commercial duration value corresponding to that offset entry is then loaded 610 and the DVR skips forward by that amount. It will be appreciated that the actual technique used to achieve this forward skip may differ between DVR models—some may be capable of instantaneously stepping forward to any location within the digitally recorded content file, others may only support a conventional "fast forward" operation, yet others may be able to step forward digitally in fixed increments to be followed by a short fast forward operation for final positioning, etc. It will also be appreciated that more advanced operations may be enabled by an appropriately configured DVR using the metadata, such as for example removing the data corresponding to the commercial portions prior to playback such that the entire program may subsequently be viewed free of "skipped over" content and without further use of the metadata as described herein. The stored metadata values are however independent of physical DVR parameters, thus allowing each DVR to act appropriately to achieve the desired skip forward or other desired action.

After the forward skip action is completed, DVR logic adjusts the timer 614 to compensate for the fast forward actions (i.e., to maintain time as an absolute value relative to the start of the program content) and resumes playback 616. Upon resumption of playback, an adjustment period similar to that previously described in conjunction with FIG. 4 may be observed in order to capture any user-initiated corrections, after which the next commercial offset value is loaded 622 from the metadata file and playback continues.

When the end of the program content is reached 606, the metadata file may be processed to incorporate any user corrections captured during the before mentioned adjustment period and playback processing is complete. Adjusted metadata values may be stored locally and/or uploaded to a remote server as previously described in conjunction with FIG. 2.

Figure 7:
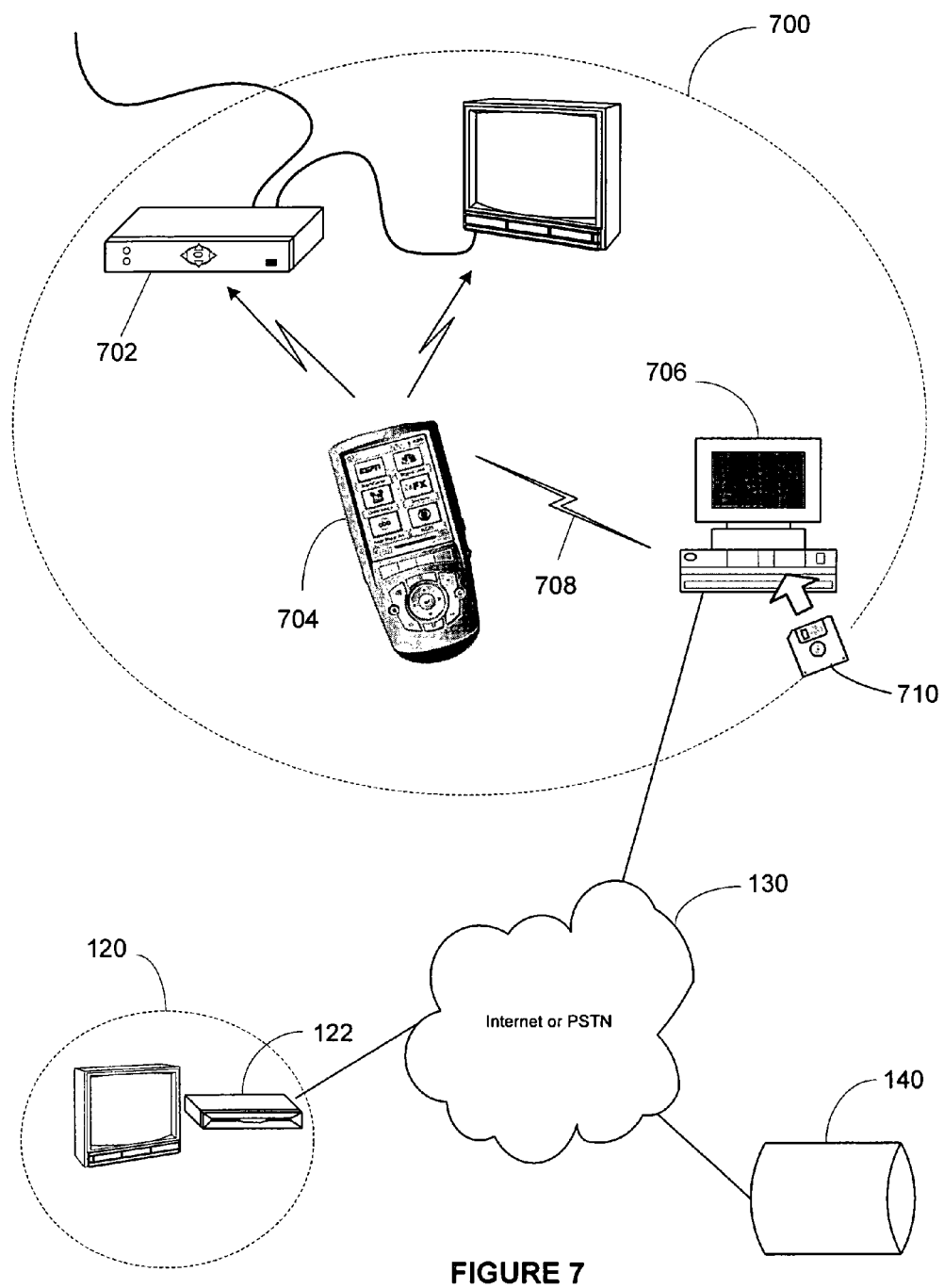
FIG. 7 illustrates a second exemplary system and network in which the gathering and utilization of metadata regarding the structure of program content may be implemented.

While the above system and method have been described as using an appropriately configured DVR or similar device to effect both user input capture and modified playback functions, in one alternate embodiment described below a remote control can be configured to effect the featured and functions of the current invention. Looking now to FIG. 7, remote control 704, in conjunction with PC 706, is configured to perform the capture, storage, and processing of metadata derived from user interactions with remote control 704 while viewing content stored on DVR 702. This illustrated embodiment is of particular utility in locations 700 where the DVR in use does not fully support the subject metadata. In one embodiment, remote control 704 is capable of wireless communication 708 with PC 706 using a protocol such as WiFi (IEEE 802.11), Bluetooth, Zigbee, proprietary point-to-point, etc. Remote control 704 may be shipped with metadata gathering and maintenance application software 710 which is to be installed on the user's local PC 706. Besides program logic to perform metadata capture and formatting in the manner described earlier, application 710 may include a database comprising the device characteristics of various DVRs, for example fast forward speed increments, default overshoot correction values, etc. During the installation process the user may be requested to identify their DVR model, or alternatively manually enter the above data.

During playback of previously recorded program content, remote control 704 may echo user entered DVR commands such as "fast forward", "play", etc. to PC 706 via wireless link 708. The application software in the PC may thus monitor these actions and, using the known characteristics of the DVR model, derive and store the commercial skip metadata entries 504 applicable to the content being viewed. Upon conclusion of playback, or at some other convenient time, the user may then be prompted to enter the balance of the variable data needed to complete the metadata header, e.g., program name and time, either on the remote control itself or at the PC. It will be appreciated that once a minimal amount of identifying information has been obtained from the user, much of the balance of the required header information may be derived, either from initial set-up parameters or from program guide data resident on or accessible to the PC or remote control. For example, once the program name and time are known, data such as network, channel, and duration may be derived from archived program guide data. After the metadata file is complete, it may be stored on PC 706 for later re-use by the remote control and/or uploaded to a remote server 140 for sharing with other users. It will also be appreciated that various permutations and combinations of this method are possible: for example, some or all of the processing described as occurring in PC 706 may instead be performed in remote control 704 itself.

One or more buttons of remote control 704 may also be configured such that during viewing of either a live broadcast or prerecorded program, user interaction with the button(s) at predetermined times (e.g., at the start point and end point of all commercial portions of the program) may be stored by memory available to the remote for later processing of the data associated with such user interactions (e.g., timestamp data, etc) into metadata useable in conjunction with the program skip operations described above. In this way data related to a particular program may be captured by a user without the use of any DVR or similar device, even during viewing of a live broadcast such that later upload of the data to a PC and/or server for further processing allows for the fastest possible generation of metadata for the particular program.

During playback operations for the current embodiment (assuming the user does not have an appropriately configured DVR or other playback device which is able to use metadata associated with a desired program for skip operations during viewing), the remote control may be configured either automatically or via user interaction with the appropriate metadata (generally via download from PC 706, or access of data stored on the remote from previous user capture sessions) to effect skip operations during viewing of a prerecorded or time-delayed program by automatically sending commands to the device controlling playback of the program at appropriate times. By way of example, using metadata containing commercial skip data such as described in conjunction with FIG. 5, the remote control 704 would automatically send, as appropriate for the particular playback device to be controlled, fast forward, play, skip, or scrub based command codes at and/or for pre-determined times or periods of time during playback such that portions of the program are effectively removed during playback. The metadata and program playback may be synchronized by, for example starting playback of both metadata and program content simultaneously upon transmission of a "play" command from the remote, or as described above, initiating metadata playback in response to an indication by the user that the first commercial portion of the program has started, generally via a button press. It will be appreciated that the particular methods for synchronizing metadata and program playback, and also effecting error correction and adjustment operations during playback (generally due to additional fast forward, skip, pause, etc commands being initiated by the user) in the current embodiment may be similar to those described above. It will be further appreciated that in order to accomplish the skip operations described above the remote control should be placed or located such that it can maintain communication with the particular playback device to be controlled for the duration of the program for which modified playback is desired. It will be yet further appreciated that, in the event that a playback device does not itself support skip functionality, the remote control may for example use the techniques described in commonly assigned U.S. Pat. No. 6,781,638, which is incorporated herein by reference in its entirety, to nevertheless provide the playback device with simulated skip searching capabilities where the remote control would use the metadata and timer to automatically initiate the transmission of appropriate commands.

* * *

While various concepts have been described in detail, it will be appreciated by those skilled in the art that various modifications and alternatives to those concepts could be developed in light of the overall teachings of the disclosure. For example, in an alternate embodiment, DVR logic may be implemented that requires a user to actively view commercial advertising segments the first time the content is played back (for example, by disabling the "fast forward" or "skip forward" functionality) while still allowing the user to tag the start and end point of commercial segments (e.g., using specially provided buttons on the remote control) thereby creating metadata that may then be used to automatically skip the commercial advertising segments on subsequent playbacks of the content. Metadata could also be used by an appropriately configured DVR to rearrange the commercial portions of a program, for example placing all commercial portions at the beginning or end of a particular program such that users could enjoy viewing of the program itself commercial free while still having access to the commercial advertisements stored before or after the commercial free content.

It will also be understood that while certain aspects of the current invention are directed toward capture and uploading of metadata to a central server for later use in playback operations (which collected metadata for a particular program can be processed using conventional statistical measures to provide the "best" metadata for downloading), metadata may be made available by program providers, either separately or as embedded data accompanying the broadcast of a particular program, and such metadata may be used interchangeably with the "captured" metadata without limiting the inventive concepts described herein.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for using metadata while rendering program content to inhibit a rendering of one or more program content segments defined by data within the metadata, comprising:
retrieving from memory the metadata for the program content, the metadata comprising data defining the one or more segments of the program content;
commencing the rendering of the program content by a playback device; and
using the data within the metadata to inhibit the rendering of the one or more segments within the program content defined by the data within the metadata;
wherein the step of using the data within the metadata to inhibit the rendering of the one or more segments of the program content comprises using the data within the metadata by a hand-held remote control device to cause the hand-held remote control device to automatically transmit commands to the playback device to affect the program content while the program content is being rendered by the playback device.

2. The method as recited in claim 1, wherein the step of using the data within the metadata comprises using the data within the metadata to cause the hand-held remote control device to automatically transmit commands to advance over the one or more segments within the program content during the playing of the program content by the playback device.

3. The method as recited in claim 1, wherein the step of retrieving from memory the metadata for the program content comprises attempting to retrieve the metadata from a network server.

4. The method as recited in claim 1, wherein the step of commencing the rendering of the program content comprises using a reference stored within the metadata to thereby synchronize the rendering of the program content with the metadata.

5. A method for using metadata related to program content to inhibit a rendering of one or more program content segments defined by data within the metadata, comprising:
monitoring a manner in which a first rendering of program content is affected by a user to create the metadata whereby the metadata comprises data which defines the one or more segments within the program content;
causing the metadata to be stored in a memory;
retrieving from the memory the metadata;
commencing a second rendering of the program content by a playback device; and
using the data within the metadata during the second rendering of the program content to inhibit the rendering of the one or more segments within the program content defined by the data within the metadata;

wherein the step of using the data within the metadata to inhibit the rendering of the one or more segments of the program content comprises using the data within the metadata by a hand-held remote control device to cause the hand-held remote control device to automatically transmit commands to the playback device to affect the program content while the program content is being rendered by the playback device.

6. The method as recited in claim 5, wherein the step of using the data within the metadata during the second rendering comprises using the data within the metadata to cause the hand-held remote control device to automatically transmit commands to advance over the one or more segments within the program content during the playing of the program content by the playback device.

7. The method as recited in claim 5, wherein the step of retrieving from memory the metadata for the program content comprises attempting to retrieve the metadata from a network server.

8. The method as recited in claim 5, wherein the step of commencing the second rendering of the program content comprises using a reference stored within the metadata to thereby synchronize the second rendering of the program content with the metadata.

9. The method as recited in claim 5, comprising determining a time relative to a reference point at which the first rendering of the program content is affected by a user and storing within the metadata data indicative of the time.

10. The method as recited in claim 9, comprising determining a duration during which the first rendering of the program content is affected by the user and storing within the metadata data indicative of the duration.

11. The method as recited in claim 5, comprising storing within the metadata data which allows the program content to be uniquely identified.

12. The method as recited in claim 5, comprising monitoring transmissions from a remote control to determine if a command has been issued from the remote control for affecting the first rendering of the program content.

13. The method as recited in claim 5, comprising monitoring input provided to a remote control to determine if the remote control is being used for affecting the first rendering of the program content.

14. The method as recited in claim 5, comprising storing the metadata in the memory of a device used to render the program content.

15. The method as recited in claim 5, comprising storing the metadata in the memory of a device used to remotely affect the rendering of the program content.

16. The method as recited in claim 5, comprising storing the metadata in the memory associated with a central server.

17. The method as recited in claim 16, comprising receiving plural versions of the metadata at the central server and using the plural versions of the metadata and one or more analytical methods to create an adjusted version of the metadata wherein the adjusted version of the metadata is the metadata used in connection with the second rendering of the program content.

* * * * *